United States Patent
Suresh et al.

(10) Patent No.: US 11,321,473 B2
(45) Date of Patent: May 3, 2022

(54) CONTROLLING USAGE OF ELECTRONICALLY SHARED INFORMATION

(71) Applicant: MASTERCARD INTERNATIONAL INCORPORATED, Purchase, NY (US)

(72) Inventors: Sriram Suresh, Toronto (CA); Maria Riesenberg, Toronto (CA); Angelika Artemova, Toronto (CA); Avinash Kaur, Singapore (SG); Jennifer Fitch, Lindsay (CA)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/809,091

(22) Filed: Mar. 4, 2020

(65) Prior Publication Data
US 2021/0279343 A1    Sep. 9, 2021

(51) Int. Cl.
*G06F 21/60* (2013.01)
*G06F 21/62* (2013.01)
*G06Q 30/02* (2012.01)

(52) U.S. Cl.
CPC ........ *G06F 21/604* (2013.01); *G06F 21/6245* (2013.01); *G06Q 30/0217* (2013.01); *G06Q 30/0236* (2013.01)

(58) Field of Classification Search
CPC .............. G06F 21/604; G06F 21/6245; G06Q 30/0217; G06Q 30/0236
See application file for complete search history.

(56) References Cited

U.S. PATENT DOCUMENTS

| | | | |
|---|---|---|---|
| 9,443,268 B1* | 9/2016 | Kapczynski | G06Q 30/04 |
| 9,569,776 B2 | 2/2017 | Carrott | |
| 10,735,406 B1* | 8/2020 | Ramanathan | H04L 63/0838 |
| 2016/0086203 A1* | 3/2016 | Dove | H04L 67/306 |
| | | | 705/7.32 |

(Continued)

OTHER PUBLICATIONS

Moiso, 2012.*

(Continued)

*Primary Examiner* — David J Stoltenberg
*Assistant Examiner* — Michael I Ezewoko
(74) *Attorney, Agent, or Firm* — Michael Best & Friedrich LLP

(57) ABSTRACT

A system, method and computer-readable medium for controlling usage of electronically shared information, including a user device, an entity device, and a server including an electronic processor. The electronic processor is configured to receive, from the user device, a request to share information for a specified purpose and send, to one or more entity devices associated with an entity, a notification that a user is requesting to share information for the specified purpose. The electronic processor is also configured to receive, from the entity device, a request for information and send a request for the information requested by the entity device to the user device. The electronic processor is further configured to receive the information requested by the entity device and conditions associated with the information from the user device and make the information accessible to the entity device based on the conditions.

18 Claims, 5 Drawing Sheets

(56) References Cited

U.S. PATENT DOCUMENTS

2019/0122197 A1    4/2019    Mendlowitz et al.
2019/0156335 A1    5/2019    Safak et al.
2019/0158540 A1    5/2019    Mahaffey et al.

OTHER PUBLICATIONS

Liu, 2010.*
Dam, 2013.*
Edelman, 2008.*
Goffman, 1974.*
Grier, 2005_.*
Hayles, 2005_.*
Kuhn, 1962.*
Lakoff, 1980.*
Mindell, 2015_.*
Treffert, 2010.*
Wirth, 1976.*

* cited by examiner

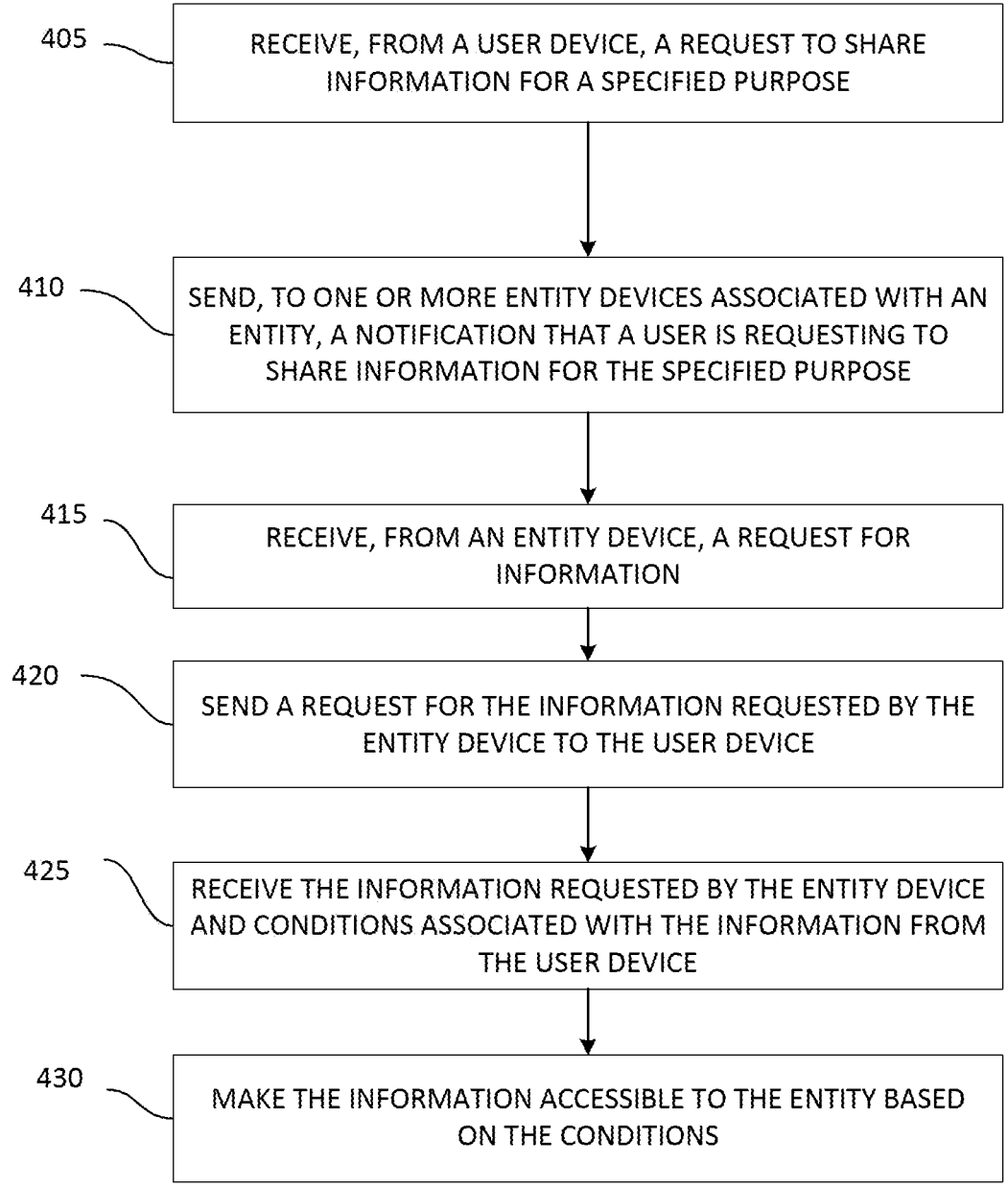

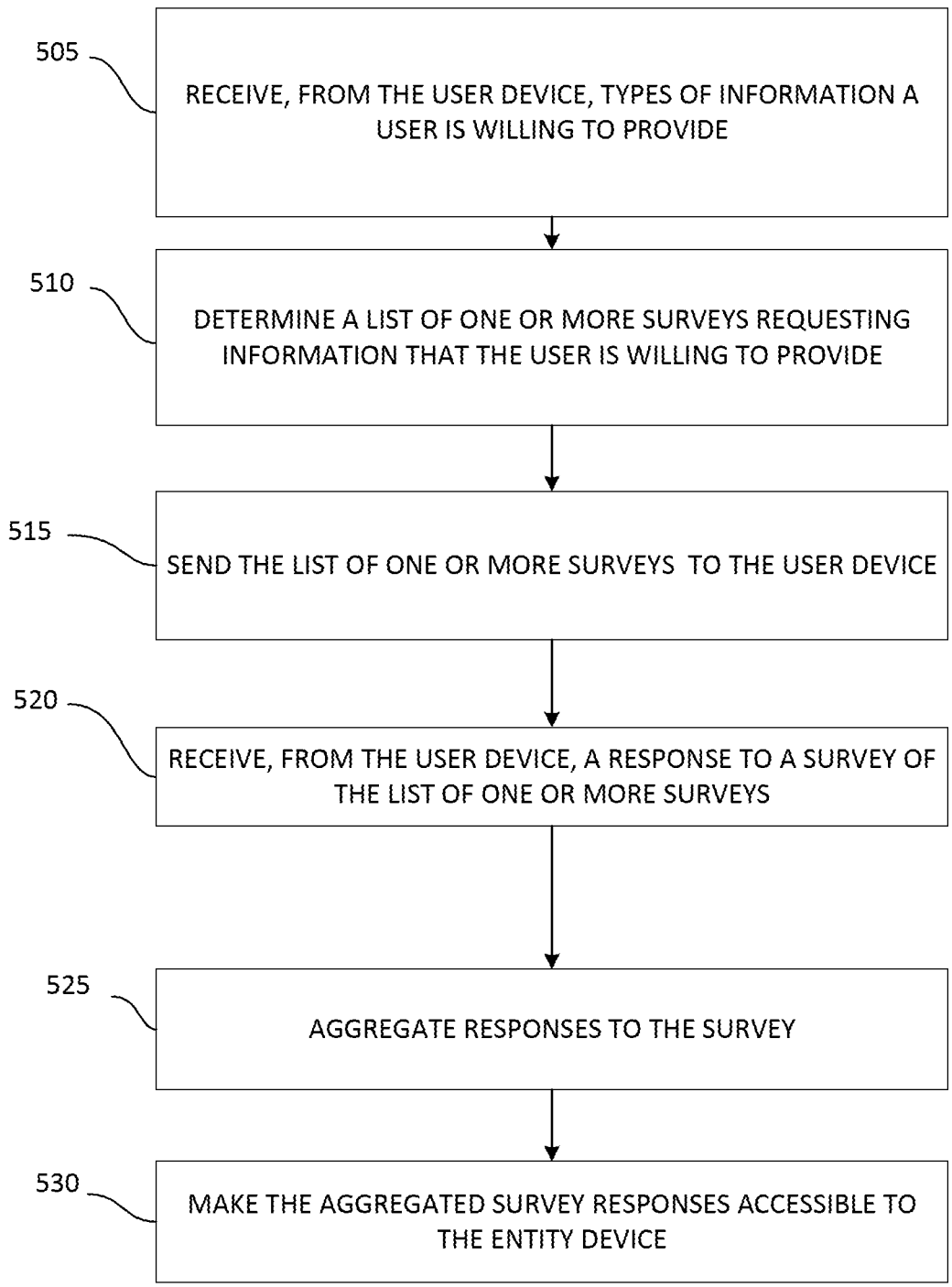

CONTROLLING USAGE OF ELECTRONICALLY SHARED INFORMATION

BACKGROUND

Users may find it necessary to share information electronically. Additionally, various entities find it useful to electronically accumulate information for analysis. However, many users are uncomfortable providing this information without having control over which entities may view or use it, and for how long.

SUMMARY

Therefore, embodiments herein describe, among other things, a system and method for providing a user control over information that is shared with an entity electronically. Information shared by a user may be, for example, related to the internet of things, physical health, and the like.

In some cases, a user may wish to share information with an entity for a specific purpose. For example, a user may wish to share physical health information for the purpose of obtaining health insurance quotes. In other cases, an entity may wish to access user's information. For example, an entity may wish to use users' information to determine a market for a product. Embodiments herein describe a secure system for sharing information electronically, allowing users to control the sharing of this information and allowing users insight into how the information is utilized.

One embodiment describes an example system for controlling usage of electronically shared information. The system includes a user device, an entity device, and a server including an electronic processor. The electronic processor is configured to receive, from the user device, a request to share information for a specified purpose and send, to one or more entity devices associated with an entity, a notification that a user is requesting to share information for the specified purpose. The electronic processor is also configured to receive, from the entity device, a request for information and send a request for the information requested by the entity device to the user device. The electronic processor is further configured to receive the information requested by the entity device and conditions associated with the information from the user device and make the information accessible to the entity device based on the conditions.

Another embodiment describes an example method of controlling usage of electronically shared information. The method includes receiving, from a user device, a request to share information for a specified purpose and sending, to one or more entity devices associated with an entity, a notification that a user is requesting to share information for the specified purpose. The method also includes receiving, from an entity device of the one or more entity device, a request for information and sending a request for the information requested by the entity device to the user device. The method further includes receiving the information requested by the entity device and conditions associated with the information from the user device and making the information accessible to the entity device based on the conditions Yet another embodiment describes an example non-transitory computer-readable medium with computer-executable instructions stored thereon executed by an electronic processor to perform the method of controlling usage of electronically shared information. The method includes receiving, from a user device, a request to share information for a specified purpose and sending, to one or more entity devices associated with an entity, a notification that a user is requesting to share information for the specified purpose. The method also includes receiving, from an entity device of the one or more entity device, a request for information and sending a request for the information requested by the entity device to the user device. The method further includes receiving the information requested by the entity device and conditions associated with the information from the user device and making the information accessible to the entity device based on the conditions.

BRIEF DESCRIPTION OF THE FIGURES

FIG. 4 is a flow chart of a method of controlling usage of electronically shared information when a user initiates sharing information in accordance with some embodiments.

FIG. 5 is a flow chart of a method of controlling usage of electronically shared information when an entity requests information in accordance with some embodiments.

DETAILED DESCRIPTION OF THE EMBODIMENTS

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
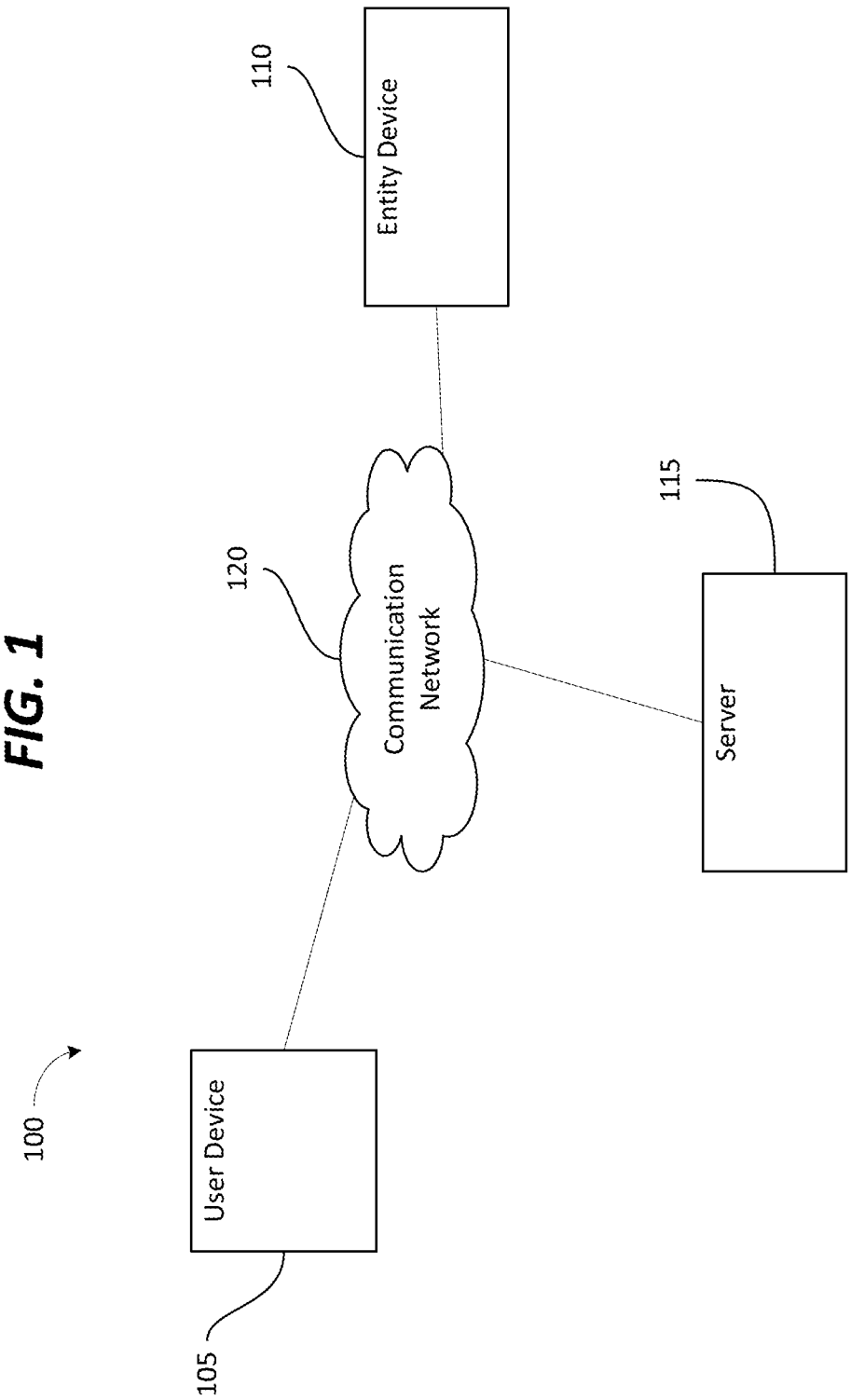
FIG. 1 is a block diagram of a system for controlling usage of electronically shared information in accordance with some embodiments.

FIG. 1 is a block diagram of a system 100 for controlling usage of electronically shared information. In the example shown, the system 100 includes a user device 105, an entity device 110, and a server 115. The user device 105, entity device 110, and server 115 are communicatively coupled via a communication network 120. The communication network 120 is an electronic communications network including wireless and wired connections. The communication network 120 may be implemented using a variety of one or more networks including, but not limited to, a wide area network, for example, the Internet; a local area network, for example, a Wi-Fi network; or a near-field network, for example, a Bluetooth™ network.

It should be understood that the system 100 may include a different number of user devices and entity devices and that the user device 105 and entity device 110 included in FIG. 1 are purely for illustrative purposes. It should also be understood that the system 100 may include a different number of servers than the number of servers illustrated in FIG. 1 and the functionality described herein as being performed by the server 115 may be performed by a plurality of servers.

Figure 2:
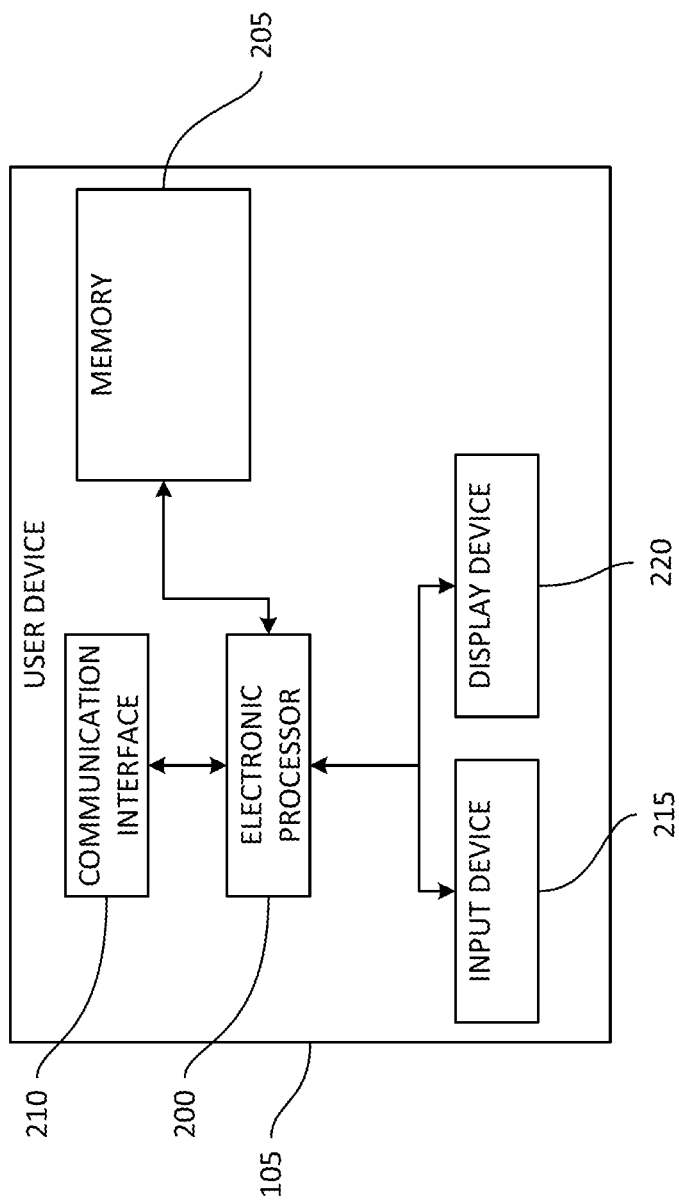
FIG. 2 is a block diagram of a user device of the system of FIG. 1 in accordance with some embodiments.

FIG. 2 is a block diagram of an example of the user device 105. In the embodiment illustrated in FIG. 2, the user device 105 is an electronic computing device (for example, a smart telephone, a laptop computer, a desktop computer, a smart wearable, a smart appliance, a smart home assistant, or other type of electronic computing device configured to operate as described herein). As illustrated in FIG. 2, the user device 105 is an electronic computing device that includes an electronic processor 200 (for example, a microprocessor, application-specific integrated circuit (ASIC), or another suitable electronic device), a memory 205 (a non-transitory, computer-readable storage medium), and a communication interface 210, such as a transceiver, for communicating over the communication network(s) 120 and, optionally, over one or more additional communication networks or connections. The communication interface 210 allows the user device 105 to communicate with the server 115 over the communication network(s) 120.

The user device 105 also includes an input device 215 and a display device 220. The display device 220 may include, for example, a touchscreen, a liquid crystal display ("LCD"), a light-emitting diode ("LED"), a LED display, an organic LED ("OLED") display, an electroluminescent display ("ELD"), and the like. The input device 215 may include, for example, a keypad, a mouse, a touchscreen (for example, as part of the display device 220), a microphone, a camera, a retinal scanner, fingerprint scanner, or the like (not shown). The electronic processor 200, the memory 205, the communication interface 210, the input device 215, and the display device 220 communicate wirelessly, over one or more communication lines or buses, or a combination thereof. It should be understood that the user device 105 may include additional components than those illustrated in FIG. 2 in various configurations and may perform additional functionality than the functionality described herein. For example, in some embodiments, the user device 105 includes multiple electronic processors, multiple memories, multiple communication interfaces, multiple input devices, multiple output devices, or a combination thereof.

Also, it should be understood that, although not described or illustrated herein, the entity device 110 is an electronic computing device (for example, a smart telephone, a laptop computer, a desktop computer, a smart wearable, a smart appliance, a smart home assistant, or other type of electronic computing device configured to operate as described herein) and may include similar components and perform similar functionality as the user device 105. The entity device 110 is associated with an entity such as an organization (for example, a financial institution, an insurance provider or the like). In some embodiments, a memory included in the entity device 110 includes an information viewer software application. In some embodiments, when executed by the electronic processor of the entity device 110, information viewer software application allows a user of the entity device 110 to access via, for example, an application program interface (API), information stored in the memory 305 of the server 110 based on one or more conditions (described further below, in relation to FIG. 4) associated with the information.

Figure 3:
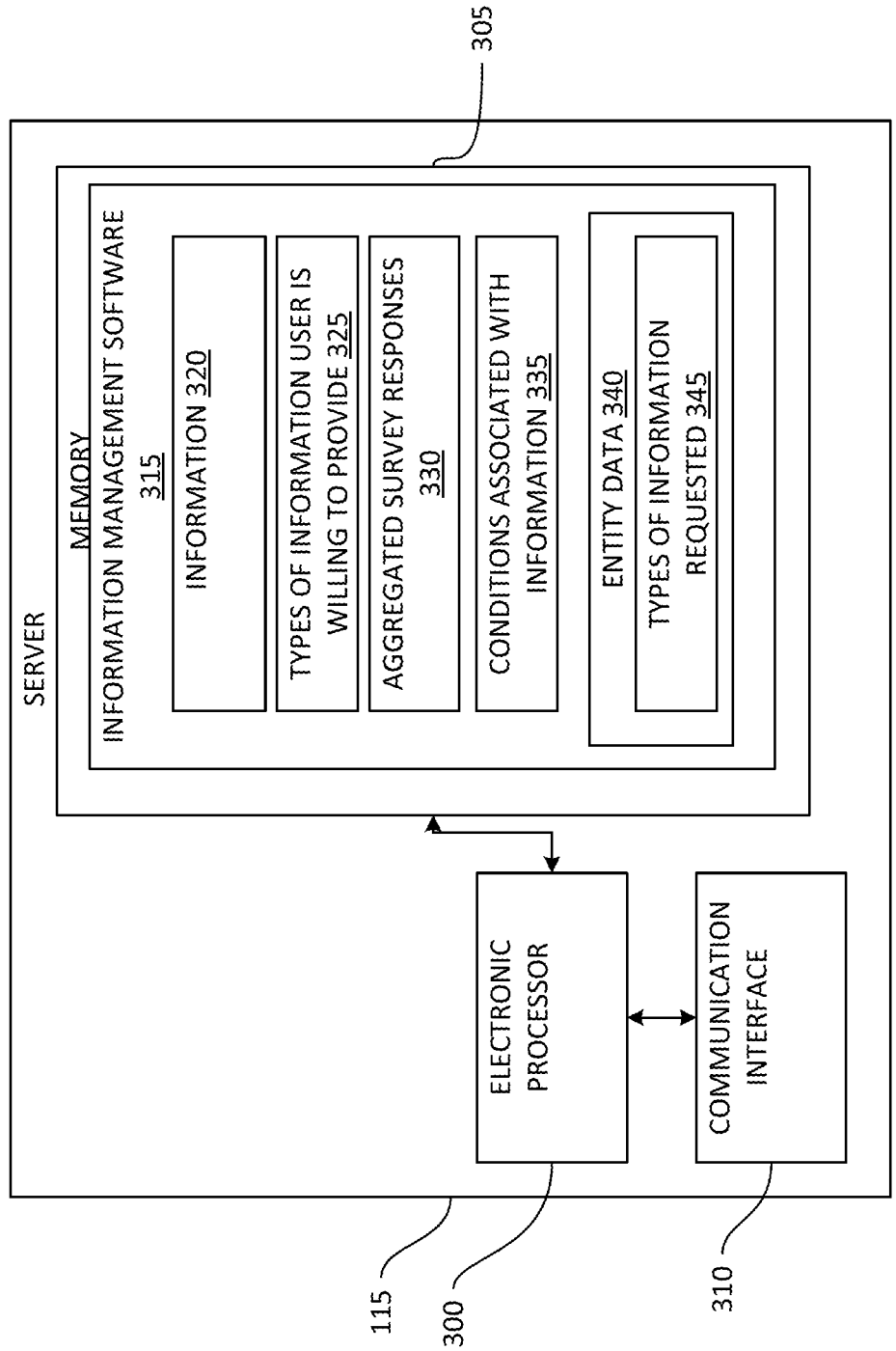
FIG. 3 is a block diagram of a server of the system of FIG. 1 in accordance with some embodiments.

FIG. 3 is an example block diagram of an example of the server 115. As illustrated in FIG. 3, the server 115 includes an electronic processor 300 (for example, a microprocessor, application-specific integrated circuit (ASIC), or another suitable electronic device), a memory 305 (a non-transitory, computer-readable storage medium), and a communication interface 310, such as a transceiver, for communicating over the communication network(s) 120 and, optionally, one or more additional communication networks or connections. The communication interface 310 allows the server 115 to communicate with the user device 105 and entity device 110 over the communication network(s) 120.

In the embodiment illustrated in FIG. 3, the memory 305 included in the server 115 includes information management software 315. The information management software 315 maintains information 320 provided by one or more users registered with the information management software 315. The information 320 may be, for example, personal information including a user's name, age, gender, race, annual income, health insurance coverage, a combination of the foregoing and the like. For each registered user, the information management software 315 maintains types of information that the user is willing to provide 325 and conditions associated with provided information 335. The information management software 315 also maintains aggregated survey responses 330 and entity data 340. The entity data 340 includes, for each entity registered with the information management software 315, types of information that the entity is requesting 345. Additionally, the information management software 315 determines information 320 that an entity may access and how long the entity may access the information 320 for, analyzes provided information 320, and tracks usage of information 320. It should be understood that the functionality described herein as being performed by the information management software 315 may be distributed among multiple applications or software components. Additionally, the information management software 315 may perform functionality other than that which is described herein.

FIG. 4 is a flow chart illustrating a method 400 of controlling usage of electronically shared information when a request to share information is received from a user device. The method 400 and functionality described in relation to the method 400 may be performed when the electronic processor 300 executes the information management software 315. The method 400 begins at step 405 when the electronic processor 300 receives, from a user device (for example, the user device 105), a request to share information for a specified purpose. For example, a user may request to share information with one or more financial institutions for the purpose of obtaining a mortgage. At step 410, the electronic processor 300 sends to one or more entity devices associated with an entity (for example, the entity device 110) a notification that the user is requesting to share their information for the specified purpose. In some embodiments, the electronic processor 300 sends the notification to a plurality of entity devices, each entity device associated with one of a plurality of different entities. In some embodiments, each entity device that receives the notification is associated with an entity that is registered with the information management software 315.

At step 415, the electronic processor 300 receives from the entity device 110 a request for information. In some embodiments, the request for information from the entity device 110 includes types of information that the entity requires access to for the purpose (for example, the types of information requested 345). For example, if the purpose is obtaining a mortgage, the types of information an entity requests may be, for example, name, age, credit score, annual income, and employment history.

At step 420, the electronic processor 300 sends, to the user device 105, the request for types of information from the user. The electronic processor 300 may also send an indication of the entity that is requesting the information. In some embodiments, the electronic processor 300 requests that the user confirm that they are willing to provide the entity with the requested information and requests that the user specify conditions associated with the information that they provide to the entity (for example, conditions associated with information 335). Conditions may include a maximum amount of time a type of information is available to the entity device 110 for, a restriction on how a type of information may be used, and the like. Restrictions on how information may be used may be, preventing an entity from printing information, forwarding information, modifying information, a combination of the foregoing, and the like. In some embodiments, different conditions may be specified for different types of information. For example, a user may specify that the entity cannot print their employment history and cannot forward their annual income or employment history. In other embodiments, the same conditions are applied to each type of information provided. The electronic processor 200 may receive conditions and confirmation of a user's willingness to provide the entity with the requested information via the input device 215 when a prompt is displayed on the display device 220.

At step 425, the electronic processor 300 receives information requested by the entity device 110 and conditions associated with the information from the user device 105. In some embodiments, when the electronic processor 300 receives the information from the user device 105, the electronic processor 300 stores the information associated with identification that uniquely identifies the user that provided the information in the memory 305 of the server 115.

At step 430, the electronic processor 300 makes the information accessible to an entity based on the conditions. In other words, the electronic processor 300 controls the ability of devices associated with the entity (for example, the entity device 110) to access the information through, for example, an API based on the received conditions. In one example, information provided by the user may include annual income and credit score and conditions associated with the information may include preventing the entity from printing the annual income and credit score. In this case print functionality is disabled when the entity device 110 accesses the user's credit score and annual income. In another example, a condition may be that the entity device 110 may not access the user's credit score and annual income for more than 14 days. When the electronic processor 300 determines that more than 14 days have passed since the user's credit score and annual income were stored on in the memory 305 of the server 115 (the maximum amount of time the entity was guaranteed access to the user's annual income and credit score for), the electronic processor 300 deletes the user's annual income and credit score from the memory 305 of the server 115, preventing the entity device 110 from accessing the user's credit score and annual income. It is important to note that information received from a user device (for example, the user device 105) is never downloaded to an entity device unless a user gives the entity permission to download their information and access their information for an unlimited amount of time. In some embodiments, an entity device may only access information when the entity device is connected to the server 115.

The entity device 110 may access provided information when a user of the entity device is authenticated as a member of an entity that has registered with the information management software 315 (for example authenticated via two factor authentication). In some embodiments, a user of the entity device 110 accesses provided information via a secure link sent to the entity device 110.

In some embodiments, the electronic processor 300 is configured to monitor the entity's use of a user's information and report usage of the information to the user device 105. In some embodiments, the electronic processor 300 may send a report to the user device 105 when the information from the user device 105 is accessed and the report may include ways the information was used when it was accessed. For example, the electronic processor 300 may send a report to the user device 105 indicating that a member of Bank X accessed and printed the user's credit score on Tuesday. The electronic processor 200 may display the information regarding the usage of the provided information via the display device 220. In some embodiments, the electronic processor 300 may periodically send reports regarding one or more entity's usage of a user's information. In some embodiments, the electronic processor 300 sends a report regarding an entity's usage of a user's information when the electronic processor 300 deletes the user's information from the memory 305 of the server 115.

FIG. 5 is a flow chart of a method 500 of controlling usage of electronically shared information when an entity requests information in accordance with some embodiments. The method 500 and functionality described in relation to the method 500 may be performed when the electronic processor 300 executes the information management software 315. The method 500 begins at step 505 when the electronic processor 300 receives one or more types of information a user is willing to provide an entity (for example, the types of information user is willing to provide 325). In some embodiments, the user has registered with the information management software 315 before step 505. In one example, the electronic processor 300 may receive the one or more types of information from the user device 105.

At step 510, the electronic processor 300 determines a list of one or more surveys requesting information that the user is willing to provide. In some embodiments, the electronic processor 300 generates the one or more surveys based on types of information requested by one or more entity devices associated with one or more entities. In some embodiments, the entities have registered with the information management software 315 before step 510. For example, the electronic processor 300 may receive a request for user's age and annual income from the entity device 110. In some embodiments, in addition to sending a request for types of information to the electronic processor 300, the entity device 110 also sends to the electronic processor 300 a predetermined amount of time (for example, 30 days) when entity devices associated with the entity will have access to provided information, one or more ways the information may be used (for example, for product marketing), both, or the like.

At step 515, the electronic processor 300 sends the list of one or more surveys to the user device (for example, the user device 105). In one example, if a user of the user device 105 specifies that they are willing to provide their age, home ownership status, credit score, and marital status, the electronic processor 300 sends to the user device 105 each survey requesting each of or a subset of age, home ownership status, credit score, and marital status. For each survey included in the list of one or more surveys, the electronic processor 300 may send the types of information the survey requests, a predetermined amount of time that the information received in response to the survey will be available to the entity for, how the information received in response to the survey will be used, monetary compensation offered for responding to the survey, a combination of the foregoing, and the like. The electronic processor 200 may display, via the display device 220, the list of one or more surveys.

At, step 520, the electronic processor 300 receives a survey response from the user device 105. For example, upon the electronic processor 200 receiving (via, for example, the input device 215) a confirmation of willingness to participate in a survey, the electronic processor 200 may send the information associated with the types of information requested by the survey and stored in the memory 205 of the user device 105 to the electronic processor 300. Upon reception of the information the electronic processor 300 may store the information in the memory 305 of the server 115.

At step 525, the electronic processor 300 aggregates responses to the survey. For example, the electronic processor 300 aggregates the responses to the survey from each user device based on type of information. For example, the electronic processor 300 may calculate the distribution of ages of survey respondents and the average income of the survey respondents. In some embodiments, the electronic processor 300 uses a software platform with analytical tools to anonymize and aggregate survey responses. It should be understood that there are calculations and aggregations of survey responses that may be performed by the electronic processor 300 that are not described herein. In some embodiments, an entity may be required to provide financial compensation for each aggregation that is performed on the information that the entity requested. For example, the electronic processor 300 may withdraw monetary compensation from a monetary account associated with a registered entity when the entity device 110 requests that an aggregation be performed using the survey responses.

At step 530, the electronic processor 300 makes the aggregated survey responses accessible to an entity device. In other words, the electronic processor 300 allows an entity device to access the aggregated survey responses through, for example, an API. In some embodiments, the aggregated survey responses are stored in the memory 305 of the server 115 (for example, aggregated survey responses 330) and the entity device 110 may only view the aggregated survey responses when the entity device 110 is connected to the server 115 via the communication network 120. In some embodiments, entity devices are not allowed to view individual survey responses (survey responses are anonymized). For example, the entity device 110 may not be able to see that a 25 year old Caucasian male makes 100,000 dollars a year and does not own a home. However, the entity device 110 may be able to see that 25% of men in their 20s own homes. In some embodiments, the entity device 110 may not be able to view the aggregated survey responses unless the aggregated survey responses include at least a predetermined number of survey responses.

The entity device 110 may access aggregated survey responses when a user of the entity device 110 is authenticated as a member of an entity that has registered with the information management software 315 (for example authenticated via two factor authentication). In some embodiments, a user of the entity device 110 accesses aggregated survey responses via a secure link sent to the entity device 110.

In some embodiments, as described above with respect to the method 400 the electronic processor 300 deletes the aggregated survey responses from the memory 305 of the server 115 when a predetermined amount of time has passed. In some embodiments, the predetermined amount of time is set by an entity and agreed to by users. In some embodiments, compensation may be provided to users that responded to the survey. For example, the electronic processor 300 may add financial compensation to a monetary account associated with the user device 105.

As also described above, the electronic processor 300 may be configured to monitor the entity's use of a user's information and report usage of the information to the user device 105. In some embodiments, the electronic processor 300 send a report to the user device 105 when their information is accessed and the report may include aggregations that were performed on the information. In some embodiments, the electronic processor 300 may periodically send reports regarding one or more entity's usage of a user's information. In some embodiments, the electronic processor 300 sends a report regarding an entity's usage of a user's information when the electronic processor 300 deletes the user's information from the memory 305 of the server 115.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for controlling usage of electronically shared information, the system comprising
   a server in communication with a user device and an entity device, the server comprising an electronic processor, the electronic processor configured to receive, from the user device, a request to share information for a specified purpose and types of information a user is willing to provide;

send, to one or more entity devices associated with an entity, a notification that a user is requesting to share information for the specified purpose;

receive, from the entity device, a request for information;

send a request for the information requested by the entity device to the user device;

receive the information requested by the entity device and conditions associated with the information from the user device, wherein the conditions include a maximum amount of time a type of information is available to the entity device;

store the information in a memory of the server;

make the information accessible to the entity device based on the conditions;

delete the information from the memory once the maximum amount of time has passed so that the information is not retained in the memory;

send a survey to the user device based on the types of information the user is willing to provide;

receive a response to the survey from the user device;

aggregate responses to the survey based on a type of information provided in the responses; and when the aggregated survey responses include at least a predetermined number of survey responses, make the aggregated survey responses accessible to the entity device via an API.

2. The system according to claim 1, wherein the conditions a restriction on how a type of information may be used.

3. The system according to claim 1, wherein the electronic processor is further configured to monitor usage of the information by the entity and report usage of the information to the user device.

4. The system according to claim 1, wherein the electronic processor is further configured to receive, from the user device, types of information a user is willing to provide;

determine a list of one or more surveys requesting information that the user is willing to provide; and send the list of one or more surveys to the user device, wherein the list of surveys includes the survey.

5. The system according to claim 1, wherein the information requested by the survey is based on information requested by the entity device.

6. The system according to claim 4, wherein, for each survey included in the list of one or more surveys, the electronic processor sends to the user device at least one selected from the group comprising types of information the survey requests, a predetermined amount of time that information received in response to the survey will be available to the entity device, how information received in response to the survey will be used, and compensation offered for responding to the survey.

7. The system according to claim 6, wherein the electronic processor is configured to store the aggregated survey responses in a memory of the server and delete the aggregated survey responses from the memory when the predetermined amount of time has passed.

8. The system according to claim 1, wherein the electronic processor is configured to anonymize the one or more responses to the survey.

9. A method for controlling usage of electronically shared information, the method comprising receiving, from a user device, a request to share information for a specified purpose and types of information a user is willing to provide;

sending, to one or more entity devices associated with an entity, a notification that a user is requesting to share information for the specified purpose;

receiving, from an entity device of the one or more entity device, a request for information;

sending a request for the information requested by the entity device to the user device;

receiving the information requested by the entity device and conditions associated with the information from the user device, wherein the conditions include a maximum amount of time a type of information is available to the entity;

storing the information in a memory of a server;

making the information accessible to the entity device based on the conditions;

deleting the information from the memory once the maximum amount of time has passed so that the information is not retained in the memory;

send a survey to the user device based on the types of information the user is willing to provide;

receive a response to the survey from the user device;

aggregate responses to the survey based on a type of information provided in the responses; and when the aggregated survey responses include at least a predetermined number of survey responses, make the aggregated survey responses accessible to the entity device via an API.

10. The method according to claim 9, wherein the conditions include a restriction on how a type of information may be used.

11. The method according to claim 9, the method further comprising monitoring usage of the information by the entity and reporting usage of the information to the user device.

12. The method according to claim 9, the method further comprising determining a list of one or more surveys requesting information that the user is willing to provide; and sending the list of one or more surveys to the user device, wherein the list of surveys includes the survey.

13. A non-transitory computer-readable medium with computer-executable instructions stored thereon executed by an electronic processor included in a server to perform the method of controlling usage of electronically shared information, comprising receiving, from a user device, a request to share information for a specified purpose;

sending, to one or more entity devices associated with an entity, a notification that a user is requesting to share information for the specified purpose;

receiving, from an entity device of the one or more entity device, a request for information;

sending a request for the information requested by the entity device to the user device;

receiving the information requested by the entity device and conditions associated with the information from the user device, wherein the conditions include a maximum amount of time a type of information is available to the entity device and a restriction on how a type of information may be used;

storing the information in a memory of a server;

making the information accessible to the entity device through an API based on the restriction on how the type of information may be used by disabling functionality that allows the entity device to use the type of information in violation of the restriction; and deleting the information from the memory once the maximum amount of time has passed so that the information is not retained in the memory.

14. The non-transitory computer-readable medium according to claim 13, the method further comprising receiving, from the user device, types of information a user is willing to provide;

determining a list of one or more surveys requesting information that the user is willing to provide;

sending the list of one or more surveys to the user device;

receiving, from the user device, a response to a survey of the list of one or more surveys;

aggregating responses to the survey; and making the aggregated survey responses accessible to the entity device.

15. The non-transitory computer-readable medium according to claim 14, wherein the information requested by the survey is based on information requested by the entity device.

16. The non-transitory computer-readable medium according to claim 14, the method further comprising, for each survey included in the list of one or more surveys, sending to the user device at least one selected from the group comprising types of information the survey requests, a predetermined amount of time that information received in response to the survey will be available to the entity device, how information received in response to the survey will be used, and compensation offered for responding to the survey.

17. The non-transitory computer-readable medium according to claim 16, the method further comprising storing the aggregated survey responses in a memory of the server and deleting the aggregated survey responses from the memory when the predetermined amount of time has passed.

18. The non-transitory computer-readable medium according to claim 14, the method further comprising anonymizing the responses to the survey.

* * * * *